(12) United States Patent
Siriwardane

(10) Patent No.: US 10,864,501 B2
(45) Date of Patent: Dec. 15, 2020

(54) METAL FERRITE OXYGEN CARRIERS FOR CONVERSION OF CO2 TO CO AND FUEL TO SYNGAS OR CO

(71) Applicant: United States Department of Energy, Washington, DC (US)

(72) Inventor: Ranjani V. Siriwardane, Morgantown, WV (US)

(73) Assignee: U.S. Department of Energy, Washington, DC (US)

(*) Notice: Subject to any disclaimer, the term of this patent is extended or adjusted under 35 U.S.C. 154(b) by 6 days.

(21) Appl. No.: 16/550,747

(22) Filed: Aug. 26, 2019

(65) Prior Publication Data
US 2020/0078773 A1 Mar. 12, 2020

Related U.S. Application Data

(62) Division of application No. 15/599,988, filed on May 19, 2017, now Pat. No. 10,427,138.

(51) Int. Cl.
*B01J 23/78* (2006.01)
*C01B 3/40* (2006.01)

(52) U.S. Cl.
CPC ............... *B01J 23/78* (2013.01); *C01B 3/40* (2013.01); *C01B 2203/0238* (2013.01); *C01B 2203/066* (2013.01); *C01B 2203/1241* (2013.01)

(58) Field of Classification Search
CPC . B01J 21/20; B01J 23/00; B01J 23/002; C10J 2300/093; C10J 2300/0976;
(Continued)

(56) References Cited

PUBLICATIONS

Fan et al. "Novel New Oxygen Carriers for Chemical Looping Combustion of Solid Fuels", Energy Fuels 2014, 28, 2248-2257 (Year: 2014).*

* cited by examiner

*Primary Examiner* — Anthony J Zimmer
*Assistant Examiner* — Syed T Iqbal
(74) *Attorney, Agent, or Firm* — Timothy L. Harney; Michael J. Dobbs; Brian J. Lally

(57) ABSTRACT

The invention provides a use of metal ferrite oxygen carrier for converting carbon dioxide to carbon monoxide or synthesis gas via three processes: catalytic dry reforming of methane, chemical looping dry reforming of fuel and promoting coal gasification with $CO_2$. The metal ferrite oxygen carrier comprises $M_zFe_xO_y$, where $M_zFe_xO_y$ is a chemical composition with $0<x\leq 4$, $z>0$ and $0<y\leq 6$ and M is one of Ca, Ba, and/or combinations thereof. For example, $M_zFe_xO_y$ may be one of $CaFe_2O_4$, $BaFe_2O_4$, $MgFe_2O_4$, $SrFe_2O_4$ and/or combinations thereof. In catalytic dry reforming, methane and carbon dioxide react in the presence of metal ferrites generating a product stream comprising at least 50 vol. % CO and $H_2$. In another embodiment, chemical looping dry reforming process where metal ferrite is reduced with a fuel and then oxidized with carbon dioxide is used for production of CO from carbon dioxide. In another embodiment, the metal ferrite is used as a promoter to produce CO continuously from coal gasification with $CO_2$.

13 Claims, 7 Drawing Sheets

Process 200

(58) Field of Classification Search
CPC .... C10J 2300/0983; C10J 3/466; F23C 10/04; F23C 2900/99008; F23C 99/00; Y02E 20/346

See application file for complete search history.

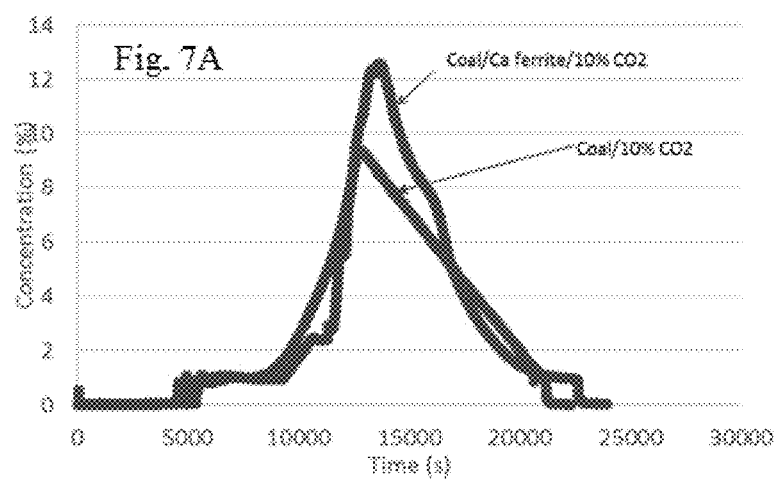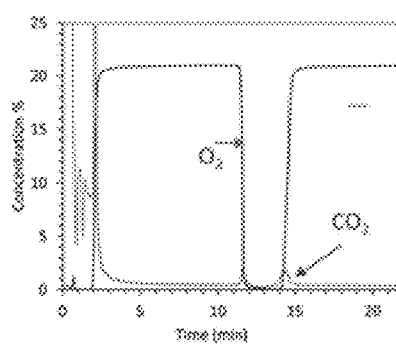

METAL FERRITE OXYGEN CARRIERS FOR CONVERSION OF CO2 TO CO AND FUEL TO SYNGAS OR CO

CROSS REFERENCE TO RELATED APPLICATION

This application is a divisional application of prior application Ser. No. 15/599,988 filed May 19, 2017, the complete subject matter of which is incorporated herein by reference.

STATEMENT OF GOVERNMENT SUPPORT

The United States Government has rights in this invention pursuant to an employer/employee relationship between the inventors and the U.S. Department of Energy, operators of the National Energy Technology Laboratory (NETL). s

FIELD OF THE INVENTION

One or more embodiments relate to conversion of $CO_2$ to CO or synthesis gas streams using Group II metal ferrites. More specifically, one or more embodiments relate to development of novel Group II metal ferrites such as Mg, Ca, Ba and Sr ferrites, for conversion of $CO_2$ to CO or synthesis gas. In one embodiment, the Group II metal ferrites are used as catalyst for methane dry reforming process with $CO_2$ to produce synthesis gas; which in another embodiment Group II metal ferrites are used in chemical looping dry reforming with $CO_2$ to produce CO and in another embodiment Group II metal ferrites are used in coal gasification with $CO_2$ to produce CO.

BACKGROUND $CO_2$ activation to produce useful products for chemical processes through a wide variety of approaches have been reported for $CO_2$ utilization to control greenhouse gas emissions. Three different methods for converting $CO_2$ to CO or synthesis gas using Group II metal ferrites. CO and synthesis gas are useful precursors for various chemical processes and are used as a fuel for energy production.

Process 1: Catalytic Dry Reforming

Catalytic dry reforming illustrated in reaction 1 is a process that converts two greenhouse gases, methane and carbon dioxide into a useful product, synthesis gas.

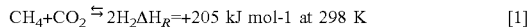
$CH_4+CO_2 \leftrightarrows 2H_2 \Delta H_R=+205$ kJ mol-1 at 298 K [1]

Natural gas which mainly consist of methane is an abundant resource. Natural gas is flared in refineries and is necessary to develop cost effectives routes to convert natural gas to useful products. Steam methane reforming (SMR) shown in reaction [2] is the commercial process to produce synthesis gas and H2 from methane.

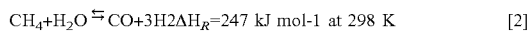
$CH_4+H_2O \leftrightarrows CO+3H_2 \Delta H_R=247$ kJ mol-1 at 298 K [2]

However, the SMR process has many disadvantages: the $H_2/CO$ ratio obtained in the product stream is very high (>3) for direct downstream conversion processes; and excess steam is introduced requiring additional energy for steam generation.

The production of syngas from $CO_2$ and $CH_4$ via dry reforming as in reaction [1] is a promising alternative and has received industry attention as it offers several advantages such as mitigation of greenhouse gases $CO_2$ and methane and converting these gasses into valuable syngas with a $H_2/CO$ ratio 1 which may be used to produce valuable chemicals downstream.

A technoeconomic analysis (See Kartick Monda, Sankar Sasmal, Srikant Badgandi, Dipabali Roy Chowdhury & Vinod Nair, Dry reforming of methane to syngas: a potential alternative process for value added chemicals—a techno-economic perspective, Environ Sci Pollut Res (2016) 23:22267-22273 DOI 10.1007/s11356-016-6310-4) indicates that dry reforming of natural gas/$CO_2$ is a competitive process with lower operating and capital costs in comparison with steam refot ming assuming a negligible cost of $CO_2$ import.

Various catalysts have been used for the dry reforming process (See Jean-Michel Lavoie, Review on dry reforming of methane, a potentially more environmentally-friendly approach to the increasing natural gas exploitation, Frontiers in chemistry, published: 11 Nov. 2014 doi: 10.3389/fchem.2014.00081, and WO Patent No. 2014/1645592 A1 to Meissner et al, titled Systems and methods for generating carbon dioxide for use as a reforming oxidant in making synthesis gas).

Supported noble metals (Pt, Pd, Rh, Ru) have shown promising results for methane dry reforming but are very expensive. Non-noble transition metals such as Ni, Co, Fe which are relatively less expensive have been used and Ni has shown the most promising results. However, Ni based catalysts tend to deactivate and there are environmental concerns with Ni. Therefore, it is necessary to develop more effective catalysts.

There is a need for catalysts used in a methane dry reforming process that improve performance, are inexpensive and environmentally safe.

Process 2: Chemical Looping Dry Reforming

In this process reported in the literature conversion of $CO_2$ to CO is accomplished using $CO_2$ as an oxidant in a process called "Chemical Looping Dry Reforming" (CLDR) (See Vladimir V. Galvitaa, Hilde Poelmana, Christophe Detavernierb, Guy B. Marin, "Catalyst-assisted chemical looping for $CO_2$ conversion to CO", Applied Catalysis B: Environmental 164 (2015) 184-191; and WO Patent No. 2014/016790 A1 to Al-Shankiti et al, titled Catalyst for thermochemical water splitting).

In the CLDR process, carbon dioxide is used for oxidizing a reduced oxygen carrier instead of using air as an oxidant as used in conventional chemical looping combustion (CLC) or in place of steam in the chemical looping steam reforming process. Either methane or coal may be used as the fuel for initial reduction of the oxygen carrier (MeO) to produce reduced metal (Me) while oxidizing the fuel. Instead of combusting the fuel fully, this initial reduction reaction of MeO may also be used to produce useful products such as CO or synthesis gas from fuel as shown in reactions [3], [4] and [5]. Then the reduced oxygen carrier (M) is oxidized with $CO_2$ to form CO and MeO as shown in reaction [6].

Reduction of Oxygen Carrier (MO):

$3MeO+2C=3Me+CO+CO_2$ [3]

$MeO+2C+H_2O=Me+2CO+H_2$ [4]

$MeO+CH_4=Me+CO+2H_2$ [5]

Oxidizer:

$Me+CO_2=MeO+CO$ [6]

Since $CO_2$ is a highly stable molecule and a weak oxidant, selection of an oxygen carrier to perform the oxidation reaction is critical for this process. Stability of oxygen carriers at extended high-temperature cyclic operation and carbon formation during oxidation with $CO_2$ are additional challenges. Additionally, slower oxidation kinetics using $CO_2$ in place of oxygen (air) that is used in CLC need to be addressed.

Thermodynamic studies have shown that Fe-based carriers were the most suitable oxygen carriers but the reactivities of Fe based structures were low. Finding a suitable oxygen carrier to convert $CO_2$ to CO has been a challenge.

There is a need for oxygen carriers for chemical looping dry reforming to convert $CO_2$ to CO.

Process 3: Conversion of CO2 to CO Via Gasification of Coal with CO2 with an Oxygen Carrier Coal gasification with $CO_2$ as illustrated in reaction [7] has been reported to produce CO. (See Muhammad F. Irfan, Muhammad R. Usman b, K. Kusakabe, Coal gasification in $CO_2$ atmosphere and its kinetics since 1948: A brief review, Energy 36 (2011) 12e40)

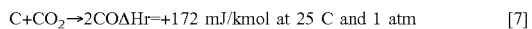

$C+CO_2 \rightarrow 2CO \Delta Hr=+172$ mJ/kmol at 25 C and 1 atm [7]

Alkali and alkali earth metals in the carbonate forms and iron have been used to promote the reaction [7]. Evaporation of these promoters and processing of coals with promoter solutions have been challenging issues for the process.

There is a need for promoters for the $CO_2$ conversion to CO via coal gasification.

SUMMARY

The invention provides Group II metal ferrites for conversion of $CO_2$ to CO or synthesis gas via three methods: catalytic dry reforming with methane and $CO_2$, chemical looping dry reforming via oxidation of the reduced metal ferrite with $CO_2$ and promoting the coal gasification reaction with $CO_2$. The metal ferrite comprises MzFexOy, where MzFexOy is a chemical composition with $0<x\leq 4$, $z>0$ and $0<y\leq 6$ and M is selected from Ca, Ba, Mg, Sr and/or combinations thereof. For example, MzFexOy may be one of $CaFe_2O_4$, $BaFe_2O_4$, $MgFe_2O_4$, $SrFe_2O_4$ and/or combinations thereof. Metal ferrite can also be supported on an inert support such as alumina, silica, zirconia, alumina-silicates or titania or the metal ferrite containing reactor bed may be diluted with the inert material.

In one embodiment, the invention provides a metal ferrite as a catalyst for dry-reforming of methane and carbon dioxide to produce syngas not diluted with nitrogen. The methane containing gas stream and carbon dioxide containing gas stream are introduced simultaneously to the metal ferrite catalyst. The metal ferrite oxygen carrier gets continuously reduced by methane while producing syngas but immediately gets oxidized by carbon dioxide. The reduction of the metal ferrite oxygen carrier and oxidation of the methane at the reducing temperature generates a product stream comprising at least 50 vol. % CO and $H_2$. In an embodiment, the reducing and oxidizing temperatures are from about 500° C. to about 1100° C. The process is operated continuously. Group II metal ferrite catalyst may be in the oxidized form or in the reduced form. For example, the Group II metal ferrite may be in the form $MzFe_xO_y$, where $z>0$, $0<x<4$ and $0<y<5$.

In another embodiment, the Group II metal ferrite oxygen carrier may be utilized for the chemical looping dry reforming by delivering the metal ferrite oxygen carrier to a fuel reactor and introducing a fuel such as methane or coal to the metal ferrite oxygen carrier at a reducing temperature, such that some portion of the metal ferrite oxygen carrier is reduced and some portion of the fuel is oxidized. Within the fuel reactor, the metal ferrite oxygen carrier interacts with the fuel, generating a reduced carrier comprising an $MzFe_xO_y$, MO and the $Fe_cO_d$ component where $c>0$ and $d\geq 0$. For example, the $Fe_cO_d$ component may be Fe or may be an iron oxide such as $Fe_3O_4$, among others. The reduction of the metal ferrite oxygen carrier may oxidize the fuel fully to produce $CO_2$ and $H_2O$ or partially oxidize the fuel at the reducing temperature generating a product stream comprising at least 50 vol. % CO and/or $H_2$. After the reduction of the oxygen carrier is completed, the reduced oxygen carrier is transferred to the oxidation reactor for oxidation with carbon dioxide containing gas stream to produce CO. The oxidized oxygen carrier after oxidation with carbon dioxide is transferred back to the fuel reactor for the next cycle. In an embodiment, the reducing and oxidizing temperatures are from about 500° C. to about 1100° C.

In another embodiment, the Group II metal ferrite may also be used as a promoter for gasification of coal. The coal and metal ferrite can be mixed and a carbon dioxide containing gas stream is supplied to the metal ferrite/coal. The reaction of coal in the presence of the metal ferrite generates a product stream comprising at least 50 vol. % CO. In an embodiment, the reducing and oxidizing temperatures are from about 500° C. to about 1100° C. Group II metal ferrite promoter may be in the oxidized form or the reduced form. For example, the Group II metal ferrite may be in the form $MzFe_xO_y$, where $z>0$, $0<x\leq 4$ and $0<y\leq 5$. The process is operated continuously.

One or more embodiments relate to a method of producing synthesis gas from methane. The method includes delivering a metal ferrite catalyst comprising MzFexOy to a catalytic reactor, where $0<x\leq 4$, $z>0$ and $0<y\leq 5$, and where M is at least one Group II alkali earth metal, and where the MzFexOy comprises at least 30 wt. % of the metal ferrite oxygen carrier. One continuous gas stream containing methane comprising at least >1 vol. % of the one continuous gas stream is delivered and another continuous gas stream containing carbon dioxide comprising at least >1 vol. % of the other continuous gas stream is delivered. The catalytic reactor at a reaction temperature is maintained, where the reaction temperature is sufficient for the reaction of methane and carbon dioxide, and generating a continuous stream of gaseous products containing $H_2$ and CO gas; and a product stream from a fuel reactor is withdrawn, where the gaseous products comprise the product stream, and where at least >50 vol. % of the product stream consists of CO and $H_2$.

Still another embodiment relates to a method for chemical looping dry reforming of methane. The method includes delivering a metal ferrite oxygen carrier comprising MzFexOy to a fuel reactor, where $0<x\leq 4$, $z>0$ and $0<y\leq 6$, and where M is at least one of Mg, Ca, Ba, Sr and/or combinations thereof; and delivering a fuel stream to the metal ferrite oxygen carrier in the fuel reactor and maintaining the fuel reactor at a reducing temperature, where the reducing temperature is sufficient to reduce some portion of the metal ferrite oxygen carrier and oxidize some portion of the fuel stream, and generating gaseous products containing $H_2$, CO or $CO_2$ gas in the fuel reactor. The reduced metal ferrite is delivered to an oxidation reactor; the reduced carrier is oxidized by contacting the reduced carrier and carbon dioxide at an oxidizing temperature, where the oxidizing temperature is sufficient to generate an oxidizing reaction, where reactants of the oxidizing reaction comprise some portion of the carbon dioxide, some portion of the M component, and some portion of the FecOd component, and where a product of the oxidizing reaction is CO and a re-oxidized carrier, where the re-oxidized carrier comprises some portion of the MzFexOy. The method further includes withdrawing a product stream CO from the oxidation reactor, where the gaseous products comprise the product stream, and where at least >50 vol. % of the product stream consists of CO.

Yet another embodiment relates to a method of producing carbon monoxide from solid carbonaceous. The method includes delivering a metal ferrite promoter comprises MzFexOy to a gasification reactor, where the metal ferrite promoter comprises MzFexOy where $0<x\leq4$, $z>0$ and $0<y\leq5$, and where M is at least one of Mg, Ca, Ba, Sr or combinations thereof, where the MzFexOy comprises at least 30 wt. % of the metal ferrite oxygen carrier. A solid carbonaceous fuel comprised at least one of coal, biomass, carbon, and municipal waste is delivered; and a continuous gas stream containing carbon dioxide of at least >1 vol. % is delivered. The gasification reactor is maintained at a reaction temperature, where the reaction temperature is sufficient for the reaction of coal and carbon dioxide, and generating a continuous stream of gaseous products containing CO gas; and a product stream is withdrawn from the gasification reactor, where the gaseous products comprise the product stream, and where at least >50 vol. % of the product stream consists of CO.

Embodiments of the Group II metal ferrite oxygen carriers disclosed are further demonstrated and described in the following description.

BRIEF DESCRIPTION OF THE DRAWINGS

FIG. 6A depicts effluent concentrations of CO, $H_2$, $CO_2$ produced during temperature ramp of Wyodak coal (0.6)/calcium ferrite (4.5 g) in Helium from ambient temperature to 850° C. and introduction of 10% $CO_2$ at 850° C.; FIG. 6B depicts effluent $CO_2$ and $O_2$ concentrations during introduction of air at 850° C.; FIG. 6C depicts moles of CO produced during coal gasification and $CO_2$ oxidation;

FIG. 7A and FIG. 7B depict data on coal gasification with Ca ferrite/$CO_2$ where FIG. 7A depicts comparisons of CO concentrations during the temperature ramp to 850° C. of Wyodak coal/10% $CO_2$/He with and without calcium ferrite and FIG. 7B illustrates effluent gas concentrations during air oidation at 850° C.

DETAILED DESCRIPTION

Figure 1:
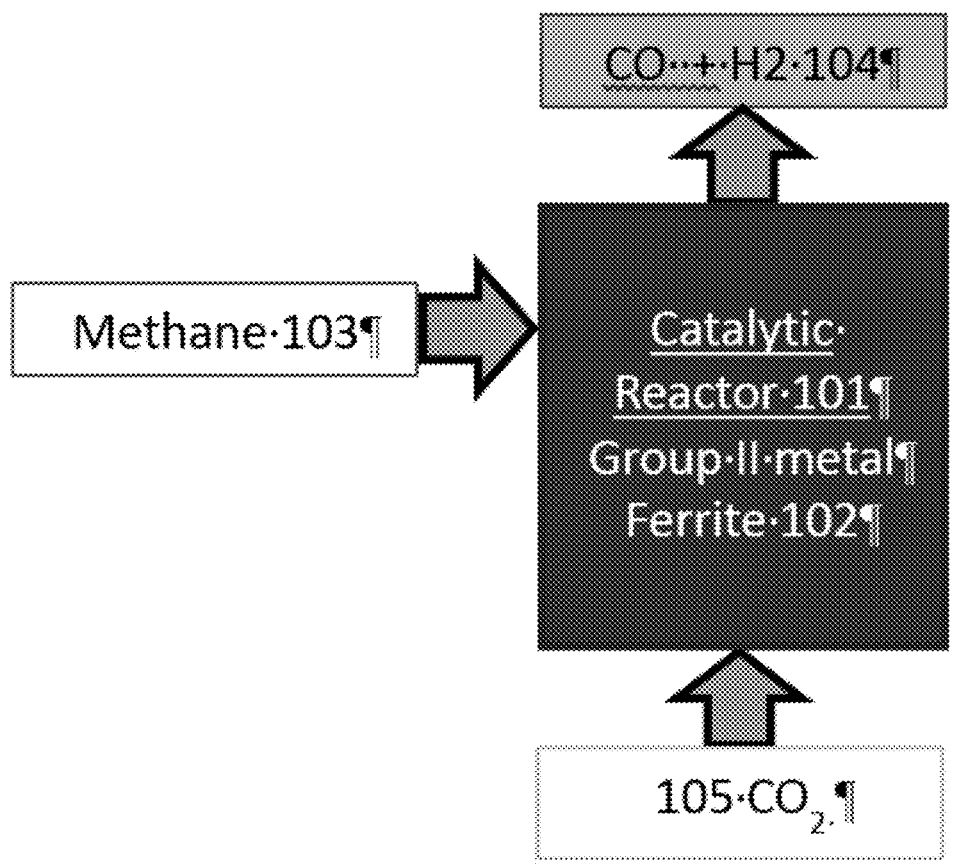
FIG. 1 depicts a catalytic methane/$CO_2$ dry reforming process using Group II metal ferrites producing synthesis gas.

The following description is provided to enable any person skilled in the art to use the described embodiments and sets forth the best mode. Various modifications, however, will remain readily apparent to those skilled in the art, since the principles relate to conversion of $CO_2$ to CO or synthesis gas streams using Group II metal ferrites. More specifically, one or more embodiments relate to the development of novel Group II metal ferrites such as Mg, Ca, Ba and Sr ferrites, for conversion of $CO_2$ to CO or synthesis gas. In one embodiment, the Group II metal ferrites are used as catalyst in a methane dry reforming process with $CO_2$ to produce synthesis gas; while in another embodiment Group II metal ferrites are used in a chemical looping dry reforming process with $CO_2$ to produce CO. In another embodiment Group II metal ferrites are used in coal gasification with $CO_2$ to produce CO.

In one or more embodiments, Group II ferrites such as Ba, Ca, Mg and Sr ferrites are used as catalysts in the methane dry reforming process are described. These ferrites are inexpensive and environmentally safe.

In at least one embodiment Group II metal ferrite oxygen carriers are used for chemical looping dry reforming to convert $CO_2$ to CO. Very high conversions of $CO_2$ to CO were observed via reaction [6].

In one or more embodiments Group II metal ferrites are used as promoters for the $CO_2$ conversion to CO via coal gasification reaction [7]. The metal ferrites may promote the $CO_2$ conversion to CO via reactions [3] and [6]. The metal ferrites may be added to coal separately without impregnating the coal with metal ferrite solutions making it a simple process for operation.

Another embodiment relates to a catalytic process using Group II ferrites combined with methane and carbon dioxide gas streams to produce a continuous stream of synthesis gas stream free of nitrogen. Group II metal ferrites such as barium and calcium ferrites have unique properties. They react with methane to produce CO and $H_2$ reducing the metal ferrites while being oxidized with carbon dioxide. The Group II metal ferrites have lower reaction rates with the CO and $H_2$, making it easier to control the reaction at the synthesis stage.

In another embodiment, Group II metal ferrites are oxygen carriers for chemical looping dry reforming to produce CO from $CO_2$. In this process, oxidized Group II metal ferrite reacts with a fuel such as coal or methane to form reduced metal ferrite and oxidation of reduced metal ferrite with $CO_2$ produces CO.

In another embodiment, Group II metal ferrites are promoters for the coal gasification reaction with carbon dioxide.

Embodiments provide a metal ferrite oxygen carrier having improved durability and reactivity over metal oxides currently used in the dry reforming of methane, chemical looping dry reforming of fuels such as coal and methane and coal gasification with $CO_2$. The metal ferrite oxygen carrier comprises MzFexOy with $0<x\leq4$, $z>0$ and $0<y\leq6$ where M is one of Ca, Ba, Mg, Sr and/or combinations thereof.

In another embodiment, the metal ferrite oxygen carrier comprises $MFe_2O_4$. In particular embodiments, the MzFexOy comprises at least 30 wt. % of the metal ferrite oxygen carrier. In certain embodiments, the metal ferrite oxygen carrier further comprises an inert support. The inert support material does not participate in the oxidation and reduction reactions of the MzFexOy comprising the metal ferrite oxygen carrier. In an embodiment, the inert support comprises from about 5 wt. % to about 70 wt. % of the metal ferrite and the MzFexOy comprises at least 30 wt. % of the metal ferrite oxygen carrier. Dry reforming of methane or coal with the metal ferrite and $CO_2$ generates a product stream of CO or syngas comprising at least 50 vol. % of the product stream.

A system 100 within which the Group II metal ferrite catalyst disclosed here may be utilized is illustrated in FIG. 1 which illustrates a catalytic dry reforming methane/$CO_2$ system including catalytic reactor 101. Metal ferrite catalyst 102 is placed in the catalytic reactor 101. Methane 103 and $CO_2$ 105 gaseous streams are introduced to the catalytic reactor 101 for the dry methane reforming reaction with metal ferrite 102. Catalytic reactor 101 is at a temperature sufficient for metal ferrite 102 to react with methane and $CO_2$. In an embodiment, the temperature in the catalytic reactor ranges from about 500° C. to about 1100° C.

The reaction involved in the catalytic reactor 101 between methane 103 and carbon dioxide 105 in the presence of metal ferrites 102 is described in reaction [1]. Within the catalytic reactor 101 metal ferrites 102 may be used in the oxidized form or in the reduced form where the metal ferrite is $MzFexOy$ with $0<x\leq4$, $z>0$ and $0<y\leq6$ where M is at least one of Ca, Ba, Mg, Sr and/or combinations thereof. For example, the metal ferrite catalyst 102 comprises $CaFe_2O_4$ on the inert support or $CaFe_2O_4$ may be mixed with inert material in the reactor bed. The metal ferrite catalyst 102 may also comprise reduced forms of $CaFe_2O_4$ which is a mixture of CaO, $CaFe_2O_5$, Fe, and FeO. In the catalytic reactor 101, the reaction between methane 103 and carbon dioxide 105 in the presence of metal ferrites 102 produces syngas comprises of CO and $H_2$ 104. At the exhaust, at least 50 vol. % of the product stream comprises CO and $H_2$. In an embodiment, at least 90 vol.+% of the product stream comprises CO and $H_2$.

Figure 2:
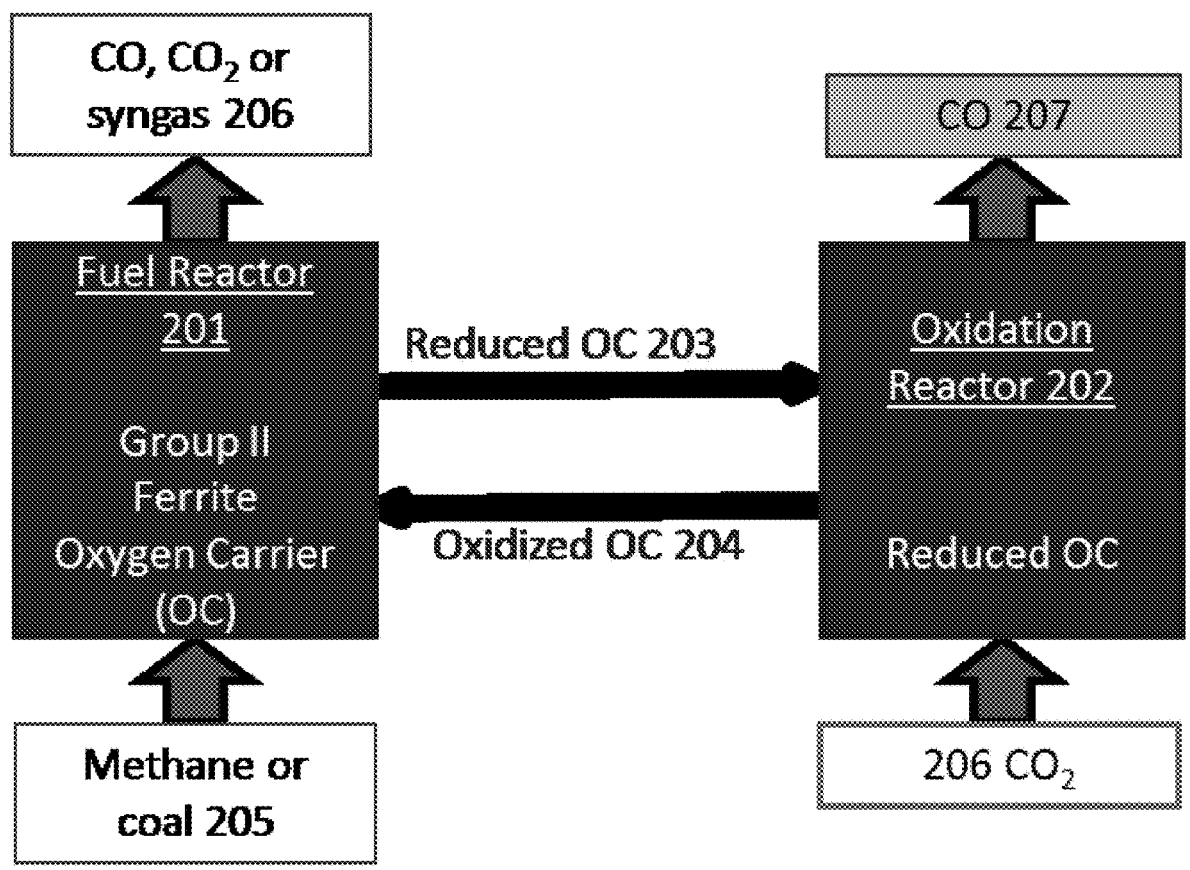
FIG. 2 depicts a chemical looping dry reforming process using Group II ferrites using a fuel reactor to produce reduced metal ferrite and synthesis gas, and in an oxidation reactor for oxidation of reduced metal ferrite with $CO_2$ to produce CO.

A system/process 200 within which the Group II metal ferrite oxygen carrier disclosed here may be utilized is illustrated in FIG. 2 which illustrates a chemical looping dry reforming of fuel with carbon dioxide system includes fuel reactor 201. Metal ferrite oxygen carrier 204 is placed in the fuel reactor 201. Fuel 205 (e.g. coal or methane) is introduced to the fuel reactor 201 for the reduction of metal ferrite oxygen carrier 204. Fuel reactor 201 is at a reducing temperature sufficient to reduce at least a portion of the metal ferrite oxygen carrier 204. In an embodiment, the reducing temperature is from about 500° C. to about 1100° C. The reactions involved in the fuel reactor 201 between metal ferrites 204 and fuel 205 are described in reactions [3-5]. When the fuel 205 is a solid fuel such as coal, steam may also be introduced with the fuel 205 to the fuel reactor 201 to promote the reduction reaction of metal ferrite 204.

Within fuel reactor 201, metal ferrite oxygen carrier interacts with fuel 205, and the $MzFexOy$ comprising the metal ferrite oxygen carrier that reduces to a reduced carrier comprising one or more M components and a $FecOd$ component. The M components comprise some portion of the M comprising the $MzFexOy$ and MO. The $FecOd$ component comprises some portion of the Fe comprising the $MzFexOy$, with $c>0$ and $d\geq0$. For example, the $FecOd$ component may be Fe or may be an iron oxide such as FeO, $Fe^0$, and $Fe_3O_4$, among others. In an embodiment, the $FecOd$ component is $FeOt$, where $0\leq t\leq 1.5$. For example, in an embodiment where the metal ferrite oxygen carrier is $CaFe_2O_4$ on the inert support, the $CaFe_2O_4$ interacts with fuel 205 in reactor 201 and generates a reduced carrier comprising CaO, Fe, $Fe_3O_4$, and $Ca_2Fe_2O_5$. In this embodiment, the M components CaO and $Ca_2Fe_2O_5$ generated by the reduction comprises some portion of the Ca comprising the $CaFe_2O_4$, and Fe and $Fe_3O_4$ comprise the $FecOd$ component $FeOt$ where $0\leq O\leq 1.5$. In an embodiment, the M components comprise some portion of the M comprising the $MzFexOy$ and having an absence of the Fe comprising the $MzFexOy$, such as for example CaO.

The reducing temperature is sufficient to reduce some portion of the $MzFexOy$ oxygen carrier and oxidize some portion of methane, generating products $CO_2$, CO or syngas 206 in the fuel reactor 201. The $CO_2$, CO or syngas products 206 are withdrawn from fuel reactor 201 as a product stream at exhaust, and the reduced carrier 203 may exit the fuel reactor. The reduced carrier 203 exiting fuel reactor may subsequently enter oxidation reactor 202. Oxidation reactor 202 further receives a flow of carbon dioxide 206 and facilitates contact between the reduced carrier 203 and carbon dioxide, generating a re-oxidized carrier 204 and a product stream CO 207 as shown in reaction [6].

The product of the oxidizing reaction is the re-oxidized carrier 204, where the re-oxidized carrier comprises $MaFebOc$ on the inert support. Generally, the $MaFebOc$ comprising the re-oxidized carrier 204 is substantially equivalent to the $MzFexOy$ comprising the metal ferrite oxygen carrier. For example, when the metal ferrite oxygen carrier comprises $CaFe_2O_4$ on the inert support and the reduced carrier 203 comprises CaO, $CaFe_2O_5$, Fe, and FeO, then the oxidation reaction generates a re-oxidized carrier 204 comprising $CaFe_2O_4$ on the inert support. Oxidation reactor 202 is at an oxidation temperature sufficient to oxidize at least a portion of the reduced carrier by carbon dioxide. In an embodiment, the oxidizing temperature ranges from about 500° C. to about 1100° C.

Within embodiments described herein, to "reduce some portion of the metal ferrite oxygen carrier" refers to the loss of oxygen from the $MzFexOy$ comprising the metal ferrite oxygen carrier. For example, the reduction of a $MzFexOy$ composition to FeO, $Fe_3O_4$, and/or Fe and an M component, where the M component comprises some portion of the M comprising the $MzFexOy$, or alternatively, the reduction of a $MzFexOy$ composition to a $MaFebOc$ composition, where $y/(z+x)>c/(a+b)$. In an embodiment, $MzFe_xO_y$ is one of $CaFe_2O_4$, $BaFe_2O_4$, and/or combinations thereof. The inert support when present does not participate in the oxidation and reduction reactions of the $MzFe_xO_y$. In an embodiment, the inert support is alumina or zirconia.

Figure 3:
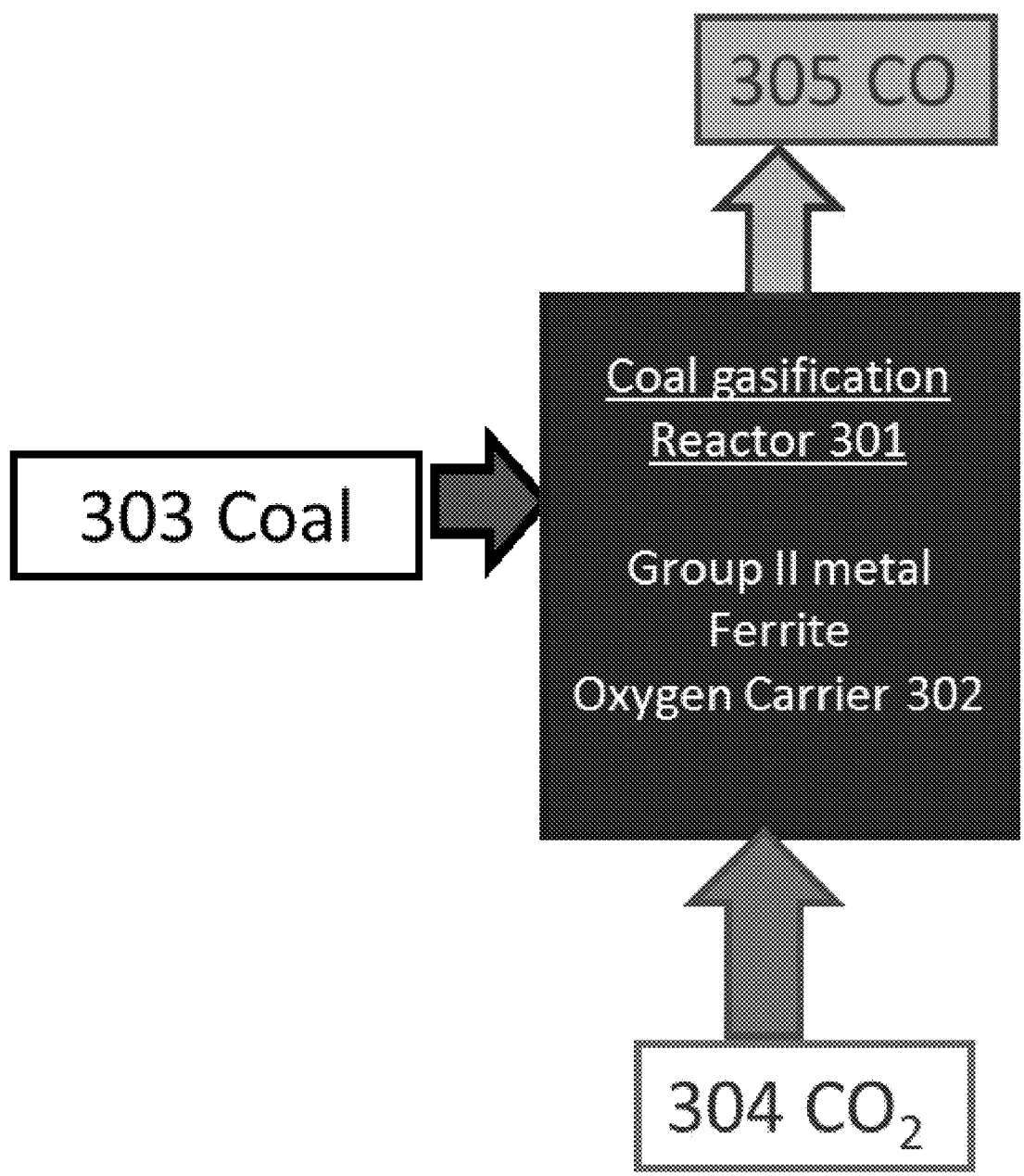
FIG. 3 depicts a process of CO production from $CO_2$ gasification of coal promoted with Group II ferrite.

Another system 300 within which the Group II metal ferrite oxygen carrier disclosed here may be utilized is illustrated in FIG. 3. In this process, Group II metal ferrites perform as promoter for coal gasification with carbon dioxide. The coal or solid carbonaceous fuel 303 and Group II metal ferrites 302 are introduced to the reactor 301. A flow of carbon dioxide 304 is introduced to produce CO 305. Reactor 302 is at a temperature sufficient to convert coal 303 to produce gas CO 305 in the presence of the metal ferrite oxygen carrier 302 as shown in reaction [7]. In an embodiment, the reaction temperature ranges from about 500° C. to about 1100° C. Both coal 303 and $CO_2$ 304 may be continuously added and Group II metal ferrite 302 placed in reactor 301. The metal ferrite oxygen carrier comprises $MzFexOy$ with $0<x\leq4$, $z>0$ and $0<y\leq6$ where M is one of Ca, Ba, Mg, Sr and/or combinations thereof. In another embodiment, the metal ferrite oxygen carrier comprises $MFe_2O_4$. In particular embodiments, the $MzFexOy$ comprises at least 30 wt. % of the metal ferrite oxygen carrier. In certain embodiments, the metal ferrite oxygen carrier further comprises an inert support. The inert support material does not participate in the oxidation and reduction reactions of the $MzFexOy$ comprising the metal ferrite oxygen carrier. In an embodiment, the inert support comprises from about 5 wt. % to about 70 wt. % of the metal ferrite and the $MzFexOy$ comprises at least 30 wt. % of the metal ferrite oxygen carrier.

$CaFe_2O_4$ was prepared by mixing metal nitrate precursors. The mixture was heated in an oven to 1000° C. at a ramp rate of 3° C./min in air and kept at 1000° C. for 6 h. These oxygen carriers can also be prepared mixing CaO and $Fe_2O_3$ instead of nitrate precursors.

In order to demonstrate the catalytic dry reforming methane with $CO_2$ in the process 100 illustrated in FIG. 1, fixed bed flow reactor studies were conducted in a laboratory-scale fixed-bed reactor (Micromeritics model Autochem 2910 atmospheric flow reactor) at 14.7 psi (1.01×105 Pa). The calcium ferrite oxygen carrier (500 mg) was diluted with zirconia (500 mg) or alumina (500 mg) was placed in the reactor and heated to 800-900° C. in a flow of Helium. At the final reaction temperature, 20% methane in Helium was introduced for 45 minutes. Then 12% methane and 11% $CO_2$ were introduced for 12 hours at 800-900° C. for the dry reforming reaction. The outlet gas stream from the reactor was analyzed using a mass spectrometer (PfeifferVacuum Thermostar).

Figure 4:
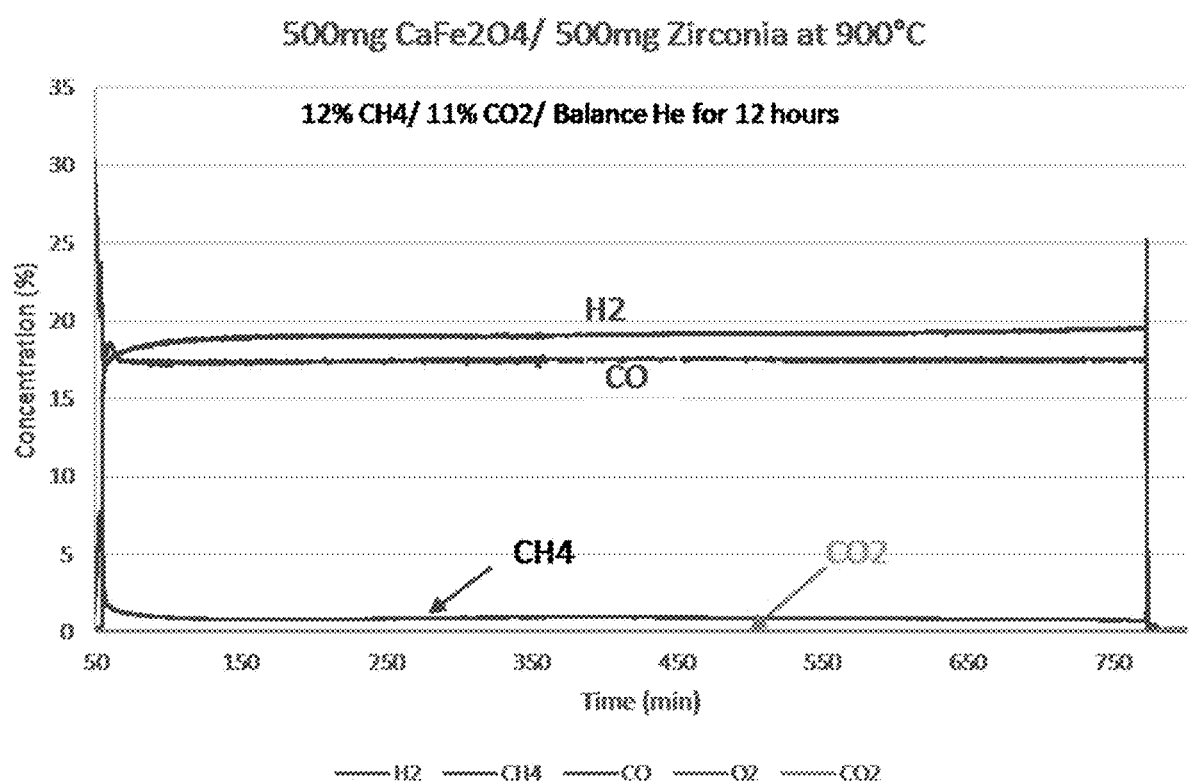
FIG. 4 depicts the effluent concentrations of CO, $H_2$, $CH_4$, $CO_2$, $O_2$ produced during dry reforming of 12% methane/11% $CO_2$ with calcium ferrite/zirconia (25 sccm, 12 hours at 900° C.)

Performance data on catalytic dry reforming methane with $CO_2$ with calcium ferrite diluted with zirconia at 900° C. is shown in FIG. 4. When 12% methane and 11% $CO_2$ were introduced at 900° C., $H_2$ and CO were formed. $CH_4$ and $CO_2$ concentrations were near zero indicating that both these gases were fully consumed to produce $H_2$ and CO. The performance was very stable during the 12-hour test.

Figure 5:
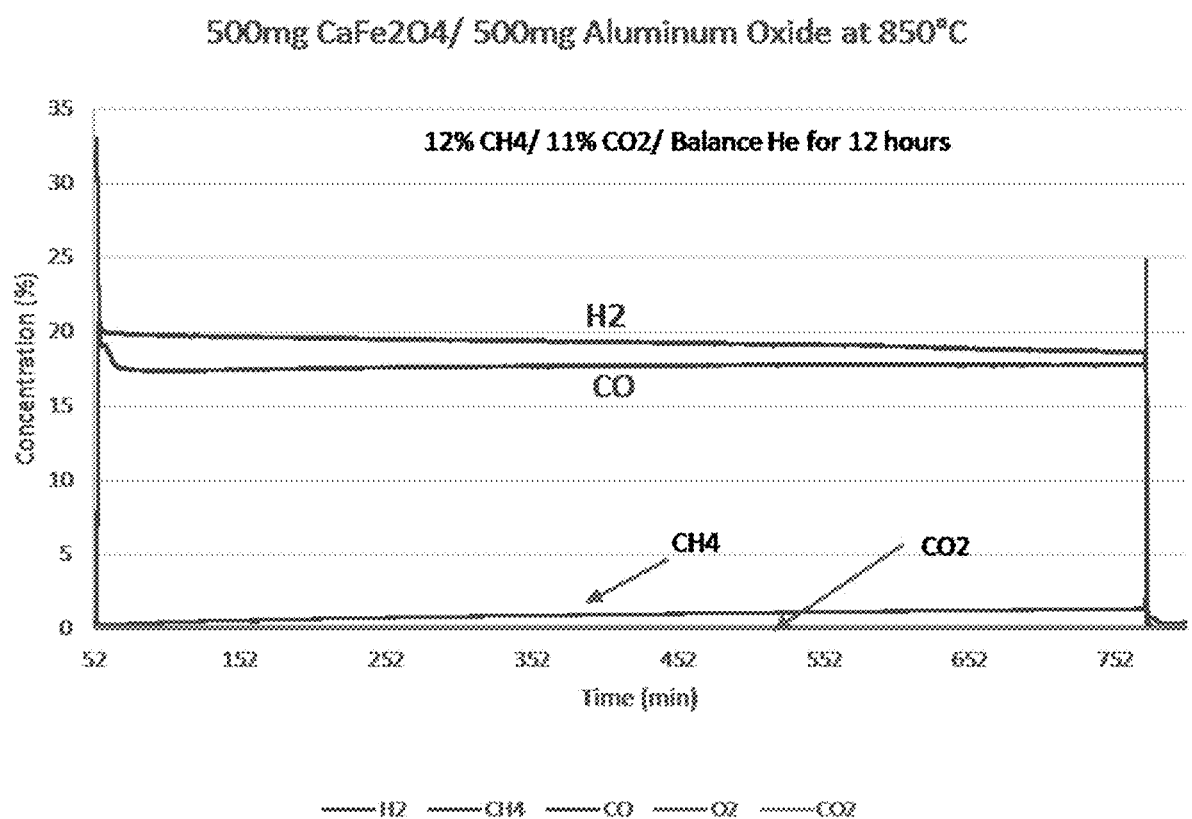
FIG. 5 depicts the effluent concentrations of CO, $H_2$, $CH_4$, $CO_2$, $O_2$ produced during dry reforming of 12% methane/11% $CO_2$ with calcium ferrite/Alumina (25 sccm, 12 hours at 850° C.)

Performance data on catalytic dry reforming methane using $CO_2$ with calcium ferrite diluted with alumina at 850° C. is shown in FIG. 5. When 12% methane and 11% $CO_2$ was introduced at 900° C., $H_2$ and CO were formed. $CH_4$ and $CO_2$ concentrations were near zero indicating that both these gases were fully consumed to produce $H_2$ and CO. The performance was very stable during the 12-hour test.

In order to demonstrate the chemical looping dry reforming process 200 in FIG. 2, fixed bed flow reactor studies were conducted in a bench scale flow reactor. Bench-scale fixed-bed flow reactor (inner diameter 7 mm) tests were conducted with a 4.5 g sample of calcium ferrite oxygen carrier and 0.6 g of Wyodak coal. The outlet gas compositions ($CO_2$, $H_2$, $CH_4$, and CO) from the reactor were measured using a MS (Pfeiffer Omnistar). The metal ferrite-coal sample was heated in Heat a flow rate of 100 cm3/min (0.1 L/min) from ambient to 850° C. (ramp rate of 4° C./min) and 10% $CO_2$ in He was introduced at 850° C. and was kept isothermal at 850° C. until the CO concentration reached zero. After the reduction step, the sample was exposed to air for 30 min at 750° C.

Figure 6A:
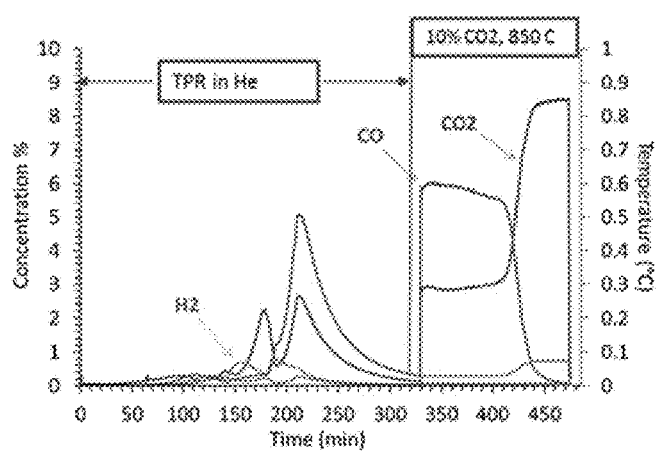
FIG. 6A, FIG. 6B and FIG. 6C depict data during chemical looping dry reforming tests with coal/$CO_2$ where
Figure 6B:
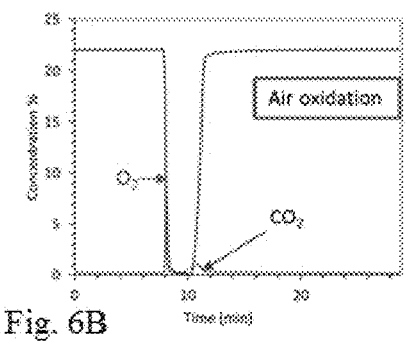
Figure 6C:
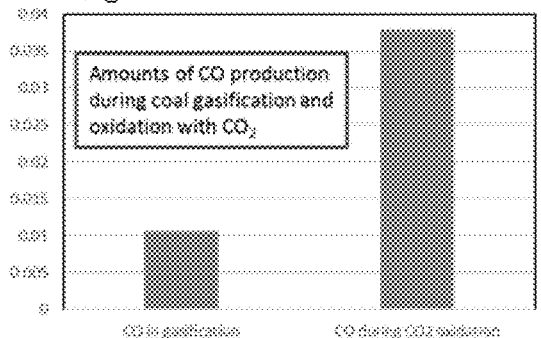

The performance data of chemical looping dry reforming with calcium ferrite is shown in FIG. 6A, FIG. 6B and FIG. 6C. During the initial temperature ramp from ambient to 850° C. in helium, coal and Ca ferrite reacted to form CO and $CO_2$, and CO was the main peak as shown in FIG. 6A. All gas concentrations reached near zero at the end of the temperature ramp at 850° C. When 10% $CO_2$ was introduced at 850° C. after the temperature ramp, $CO_2$ concentration decreased with a simultaneous increase in the concentration of CO as also shown in FIG. 6A. Formation of CO continued for 110 minutes. The data indicated that the calcium ferrite that was reduced by coal during the temperature ramp was oxidized by $CO_2$ at 850° C. to form CO. After the $CO_2$ introduction, air was introduced at 750° C. to determine the amount of coal that was left in the reactor and the amount of calcium ferrite that was not oxidized by $CO_2$ and the results are shown in FIG. 6B. The amount of $CO_2$ was very low indicating that all the coal was consumed and oxygen consumption was also low indicating that the reduced Ca ferrite was mostly oxidized with $CO_2$. The moles of CO produced during the initial temperature ramp for coal gasification with calcium ferrite and during oxidation of the reduced Ca ferrite with $CO_2$ are shown in FIG. 6C. There is a very high amount of CO produced during oxidation with $CO_2$ indicating that reduced Ca ferrite is oxidized by $CO_2$ while producing CO.

In order to demonstrate the process 300, gasification of Wyodak coal with $CO_2$ was conducted in the presence of calcium ferrite in a fixed bed flow reactor. The fixed-bed flow reactor (inner diameter 7 mm) tests were conducted with a 4.5 g sample of calcium ferrite and 0.6 g of Wyodak coal. The metal ferrite-coal sample was heated in in 10% $CO_2$ in He at a flow rate of 100 cm3/min (0.1 L/min) from ambient to 850° C. (ramp rate of 4° C./min). For comparisons, coal without the oxygen carrier was used in another experiment. The outlet gas compositions ($CO_2$, $H_2$, $CH_4$, and CO) from the reactor were measured using a MS (Pfeiffer Omnistar). The effluent CO concentrations during the temperature ramp in 10% $CO_2$ with and without Ca ferrite are shown in FIG. 7A. The CO concentration peak maximum was higher with coal/Ca ferrite/$CO_2$ than that with coal/$CO_2$ which indicated that Ca ferrite promotes the coal gasification with $CO_2$. After the temperature ramp of coal/Ca ferrite with $CO_2$, air was introduced at 850° C. and the effluent concentrations are shown in FIG. 7B. The $CO_2$ peaks are very low indicating most of the coal was gasified with $CO_2$ during the temperature ramp. The oxygen uptake was also very low indicating that the Ca ferrite remains in the oxidized state after the temperature ramp with $CO_2$.

Embodiments of the present invention provide one or more of the following:

Conversion of greenhouse gas, $CO_2$ to useful chemical precursors such as CO and syngas using Group II metal ferrites are described in this invention;

Use of Group II metal ferrites as a catalyst to produce synthesis gas continuously via dry reforming of methane and carbon dioxide is described. Complete consumption of methane and $CO_2$ to produce syngas was observed and the process demonstrated for 12 hours without any deactivation. Group II metal ferrites are low cost and environmentally safe unlike the Ni based materials reported for the process in the past;

Use of Group II ferrites in chemical looping dry reforming of fuel and $CO_2$ to produce syngas and CO is also described. The process involves reacting the Group II ferrites with methane or coal to form synthesis gas and reduced metal ferrite in the fuel reactor followed by oxidation of the reduced metal ferrite with carbon dioxide to form CO in the oxidation reactor. Production of CO with Wyodak coal/calcium ferrite and oxidation of reduced calcium ferrite with carbon dioxide to from CO was demonstrated. High CO yields were obtained in the process;

Use of Group II ferrites for promotion of $CO_2$ gasification of coal to produce CO is described. Production of CO at higher rates with Wyodak coal/$CO_2$/Ca ferrite than that with Wyodak coal/Ca ferrite was demonstrated.

In addition to improved performance, Group II metal ferrites are low cost and environmentally safe as compared to materials previously used for these processes.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and/or combinations of sub-ranges thereof. Any listed range is easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains.

As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

What is claimed is:

1. A method for chemical looping dry reforming of methane comprising:
    delivering a metal ferrite oxygen carrier comprising MzFexOy to a fuel reactor, where $0<x\leq 4$, $z>0$ and $0<y\leq 6$, and where M is at least one of Mg, Ca, Ba, Sr or combinations thereof;
    delivering a fuel stream to the metal ferrite oxygen carrier in the fuel reactor and maintaining the fuel reactor at a reducing temperature, where the reducing temperature is sufficient to reduce some portion of the metal ferrite oxygen carrier and oxidize some portion of the fuel stream, and generating gaseous products containing H2, CO or CO2 gas in the fuel reactor;
    delivering the reduced metal ferrite to an oxidation reactor;
    oxidizing the reduced carrier by contacting the reduced carrier and carbon dioxide at an oxidizing temperature, where the oxidizing temperature is sufficient to generate an oxidizing reaction, where reactants of the oxidizing reaction comprise some portion of the carbon dioxide, some portion of the M component, and some portion of a FecOd component, where $c>0$ and $d\geq 0$ and where a product of the oxidizing reaction is CO and a re-oxidized carrier, where the re-oxidized carrier comprises some portion of the MzFexOy; and
    withdrawing a product stream CO from the oxidation reactor, where the gaseous products comprise the product stream, and where at least >50 vol. % of the product stream consists of CO.

2. The method of claim 1 where the reducing temperature ranges from about 500° C. to about 1100° C.

3. The method of claim 1 where $2>z>0$, $2\leq x\leq 3$ and $3\leq y\leq 5$.

4. The method of claim 1 where the MzFexOy comprises at least 30 wt. % of the metal ferrite oxygen carrier.

5. The method of claim 1 where the metal ferrite oxygen carrier further comprises an inert support, where the inert support comprises from about 5 wt. % to about 70 wt. % of the metal ferrite oxygen carrier.

6. The method of claim 1 wherein the inert support contains at least one of alumina, silica, zirconia, clay, titania, monolith or combinations thereof.

7. The method of claim 1 where the mixing the fuel stream and the metal ferrite oxygen carrier in the fuel reactor step generates a reduced carrier, where the reduced carrier comprises an M component and an FecOd component, where the M component comprises some portion of the M comprising the MzFexOy, and MO and where the FecOd component comprises some portion of the Fe comprising the MzFexOy, where $c>0$ and $d\geq 0$.

8. The method of claim 7 where the FecOd component comprises $Fe^0$, FeO, Fe3O4 or Fe2O3 and M component comprises MO or MCO3.

9. The method in claim 1 where the fuel in the fuel reactor is coal, methane or bio mass.

10. The method of claim 9 wherein the methane concentration may be greater than 5 vol %.

11. The method of claim 1 wherein oxidization of the reduced carrier occurs in an oxidizing reactor, and further comprising:
    transferring the reduced carrier from the fuel reactor to the oxidizing reactor; supplying the carbon dioxide containing gas stream to the oxidizing reactor, thereby generating the re-oxidized carrier, producing carbon monoxide;
    transferring the re-oxidized carrier from the oxidizing reactor to the fuel reactor; and
    repeating the delivering the metal ferrite oxygen carrier to the fuel reactor, introducing methane or coal to the metal ferrite oxygen carrier in the fuel reactor, and the withdrawing the product stream from both the fuel reactor and the oxidizing reactor.

12. The method of claim 11 where the oxidizing temperature ranges from about 500° C. to about 1100° C.

13. The method of claim 11 wherein the carbon dioxide gas stream may be provided by carbon dioxide separated from fuel combustion streams with air or fuel chemical looping combustion streams.

* * * * *